(12) United States Patent
Tarafdar et al.

(10) Patent No.: US 10,250,588 B1
(45) Date of Patent: Apr. 2, 2019

(54) SYSTEMS AND METHODS FOR DETERMINING REPUTATIONS OF DIGITAL CERTIFICATE SIGNERS

(71) Applicant: Symantec Corporation, Mountain View, CA (US)

(72) Inventors: Shayak Tarafdar, Kolkata (IN); Sunil Kumar, Bihar (IN); Pratik Vagyani, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 261 days.

(21) Appl. No.: 15/452,109

(22) Filed: Mar. 7, 2017

(51) Int. Cl.
　　*H04L 29/06* (2006.01)
　　*G06F 21/00* (2013.01)
　　*H04L 9/32* (2006.01)

(52) U.S. Cl.
　　CPC ........ *H04L 63/0823* (2013.01); *H04L 9/3247* (2013.01); *H04L 63/0853* (2013.01)

(58) Field of Classification Search
　　CPC ............. H04L 63/0823; H04L 63/0853; H04L 9/3247
　　See application file for complete search history.

(56) References Cited

U.S. PATENT DOCUMENTS

| | | | | |
|---|---|---|---|---|
| 9,680,873 | B1 * | 6/2017 | Halls | H04L 63/20 |
| 2012/0260345 | A1 * | 10/2012 | Quinn | G06F 21/57 726/26 |
| 2014/0250299 | A1 * | 9/2014 | Kim | G06F 21/51 713/158 |
| 2016/0277193 | A1 * | 9/2016 | Sabin | H04L 9/3263 |

FOREIGN PATENT DOCUMENTS

CN　　101616165 B　*　3/2013

OTHER PUBLICATIONS

Viljoen; Systems and Methods for Evaluating Security Services; U.S. Appl. No. 15/432,905, filed Feb. 14, 2017.
Norton Insight; https://en.wikipedia.org/wiki/Norton_Insight; May 2, 2016; as accessed on Feb. 26, 2017.

(Continued)

*Primary Examiner* — Lisa C Lewis
(74) *Attorney, Agent, or Firm* — FisherBroyles, LLP

(57) ABSTRACT

The disclosed computer-implemented method for determining reputations of digital certificate signers may include (i) identifying a group of endpoint devices that have accessed files to which a digital certificate signer has attached digital certificates that assert the files are legitimate, (ii) determining, for each endpoint device, whether a security state of the endpoint device is compromised or uncompromised based on a security analysis of computing events detected on the endpoint device, (iii) classifying the digital certificate signer as potentially malicious by determining that the files were accessed more frequently by endpoint devices with compromised security states than by endpoint devices with uncompromised security states, and (iv) protecting a security state of an additional endpoint device by preventing the additional endpoint device from accessing a file with a digital certificate signed by the digital certificate signer. Various other methods, systems, and computer-readable media are also disclosed.

20 Claims, 7 Drawing Sheets

(56) References Cited

OTHER PUBLICATIONS

Public Key Certificate; https://en.wikipedia.org/wiki/Public_key_certificate; as accessed on Feb. 16, 2016.
Digital Certificates; https://technet.microsoft.com/en-us/library/cc962029.aspx; Jan. 23, 2011; as accessed on Feb. 25, 2016.

* cited by examiner

Table of Digital Certificate Signer Classifications
502

| DIGITAL CERTIFICATE SIGNER | COMPROMISED DEVICES | UNCOMPROMISED DEVICES | CLASSIFICATION |
| --- | --- | --- | --- |
| Signer A | 1034 | 56 | Malicious |
| Signer B | 78 | 2458 | Non-malicious |
| Signer C | 3056 | 2876 | Malicious |
| Signer D | 841 | 0 | Malicious |

FIG. 5

SYSTEMS AND METHODS FOR DETERMINING REPUTATIONS OF DIGITAL CERTIFICATE SIGNERS

BACKGROUND

Software developers may often assert the legitimacy of their products to consumers by appending digital certificates to files they have created. A digital certificate may verify or identify the creator of a file by providing a "signature" that contains a hash of the file after it has been encrypted with a private key. A user or computing device wishing to verify the identity of the file's creator may decrypt the signature using a corresponding public key. In some examples, a digital certificate may be signed directly by the creator of a file (e.g., the creator may sign the certificate with their own private key). In other examples, software developers may request that a third party (e.g., a certificate authority) sign a digital certificate on their behalf. If a user accessing a file trusts the signer of the file's digital certificate, the user may conclude that the creator of the file is accurately asserting their identity and therefore trust content within the file. Otherwise, the user may conclude that the file is potentially malicious.

Unfortunately, traditional systems for determining reputations of digital certificate signers may be unable to accurately and efficiently classify signers as malicious or legitimate. For example, conventional security technologies may determine a reputation of a digital certificate signer based on reputations or security characteristics of files signed by the digital certificate signer. However, because digital certificate signers may sign thousands of digital certificates, such analyses may be costly, time-intensive, and ultimately ineffective. Moreover, due to the large numbers of files associated with digital certificate signers, incorrectly classifying a signer may result in widespread security concerns for users and enterprises. The instant disclosure, therefore, identifies and addresses a need for systems and methods for determining reputations of digital certificate signers.

SUMMARY

As will be described in greater detail below, the instant disclosure describes various systems and methods for determining reputations of digital certificate signers. In one example, a method for determining reputations of digital certificate signers may include (i) identifying a group of endpoint devices that have accessed files to which a digital certificate signer has attached digital certificates that assert the files are legitimate, (ii) determining, for each endpoint device, whether a security state of the endpoint device is compromised or uncompromised based on a security analysis of computing events detected on the endpoint device, (iii) classifying the digital certificate signer as potentially malicious by determining that the files were accessed more frequently by endpoint devices with compromised security states than by endpoint devices with uncompromised security states, and (iv) protecting a security state of an additional endpoint device by preventing the additional endpoint device from accessing a file with a digital certificate signed by the digital certificate signer.

In some examples, the digital certificate signer may represent a creator of the files. In other examples, the digital certificate signer may represent a third party not associated with the creation of the files.

In some embodiments, identifying the group of endpoint devices that have accessed the files may include identifying, via an agent installed on each endpoint device within an enterprise, digital certificate signers of digital certificates attached to each file accessed by the endpoint devices within the enterprise.

In some examples, determining whether the security state of the endpoint device is compromised or uncompromised may include determining whether at least a predetermined number of malicious computing events occurred on the endpoint device. Additionally, in some embodiments, classifying the digital certificate signer as potentially malicious may include analyzing the security states of the endpoint devices that accessed the files, rather than analyzing security characteristics of the files.

In some examples, the method may include adding the digital certificate signer to a blacklist of digital certificate signers known to be malicious. In these examples, preventing the additional endpoint device from accessing the file with the digital certificate signed by the digital certificate signer may include comparing digital certificate signers of digital certificates attached to each file the additional endpoint device attempts to access with the blacklist before allowing the additional endpoint device to access the files.

In some embodiments, the method may further include classifying an additional digital certificate signer as legitimate by determining that at least one additional file to which the additional digital certificate signer has attached an additional digital certificate was accessed more frequently by endpoint devices with uncompromised security states than by endpoint devices with compromised security states. The method may then include adding the additional digital certificate signer to a whitelist of digital certificate signers known to be legitimate.

In one embodiment, a system for determining reputations of digital certificate signers may include several modules stored in memory, including (i) an identification module that identifies a group of endpoint devices that have accessed files to which a digital certificate signer has attached digital certificates that assert the files are legitimate, (ii) a determination module that determines, for each endpoint device, whether a security state of the endpoint device is compromised or uncompromised based on a security analysis of computing events detected on the endpoint device, (iii) a classification module that classifies the digital certificate signer as potentially malicious by determining that the files were accessed more frequently by endpoint devices with compromised security states than by endpoint devices with uncompromised security states, and (iv) a security module that protects a security state of an additional endpoint device by preventing the additional endpoint device from accessing a file with a digital certificate signed by the digital certificate signer. In addition, the system may include at least one physical processor configured to execute the identification module, the determination module, the classification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of endpoint devices that have accessed files to which a digital certificate signer has attached digital certificates that assert the files are legitimate, (ii) determine, for each endpoint device, whether a security state of the endpoint device is compromised or uncompromised based on a security analysis of computing events detected on the endpoint device, (iii) classify the digital certificate signer as potentially malicious by determining that the files were accessed more frequently by endpoint devices with compromised security states than by endpoint devices with uncompromised security states, and (iv) protect a security state of an additional endpoint device by preventing the additional endpoint device from accessing a file with a digital certificate signed by the digital certificate signer Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5 is a table of example classifications of digital certificate signers.

Figure 1:
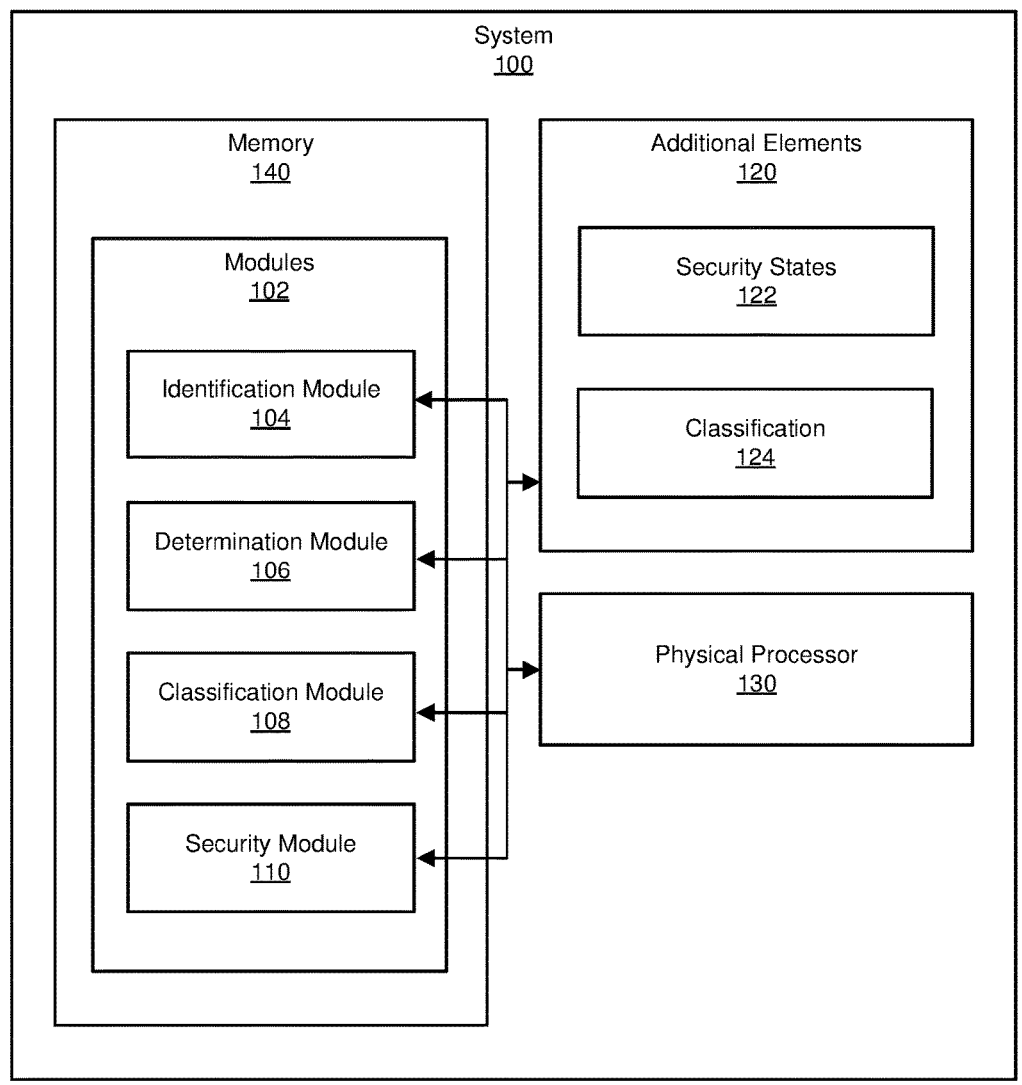
FIG. 1 is a block diagram of an example system for determining reputations of digital certificate signers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for determining reputations of digital certificate signers. As will be explained in greater detail below, by analyzing security states of endpoint devices that have accessed files with digital certificates signed by a digital certificate signer, the disclosed systems and methods may determine a reputation of the digital certificate signer. For example, the systems and methods described herein may classify a signer as malicious or legitimate by determining whether files with digital certificates signed by the digital certificate signer have been more frequently accessed by clean or infected endpoint devices. As such, the disclosed systems and methods may accurately and efficiently determine the reputation of a digital certificate signer without analyzing content or behavior of files associated with the signer.

In addition, the systems and methods described herein may improve the functioning of a computing device by preventing the computing device from accessing malicious files that have digital certificates provided by illegitimate signers. These systems and methods may also improve the fields of software security and malware detection by identifying malicious digital certificate signers that distribute malware and other illegitimate files.

Figure 2:
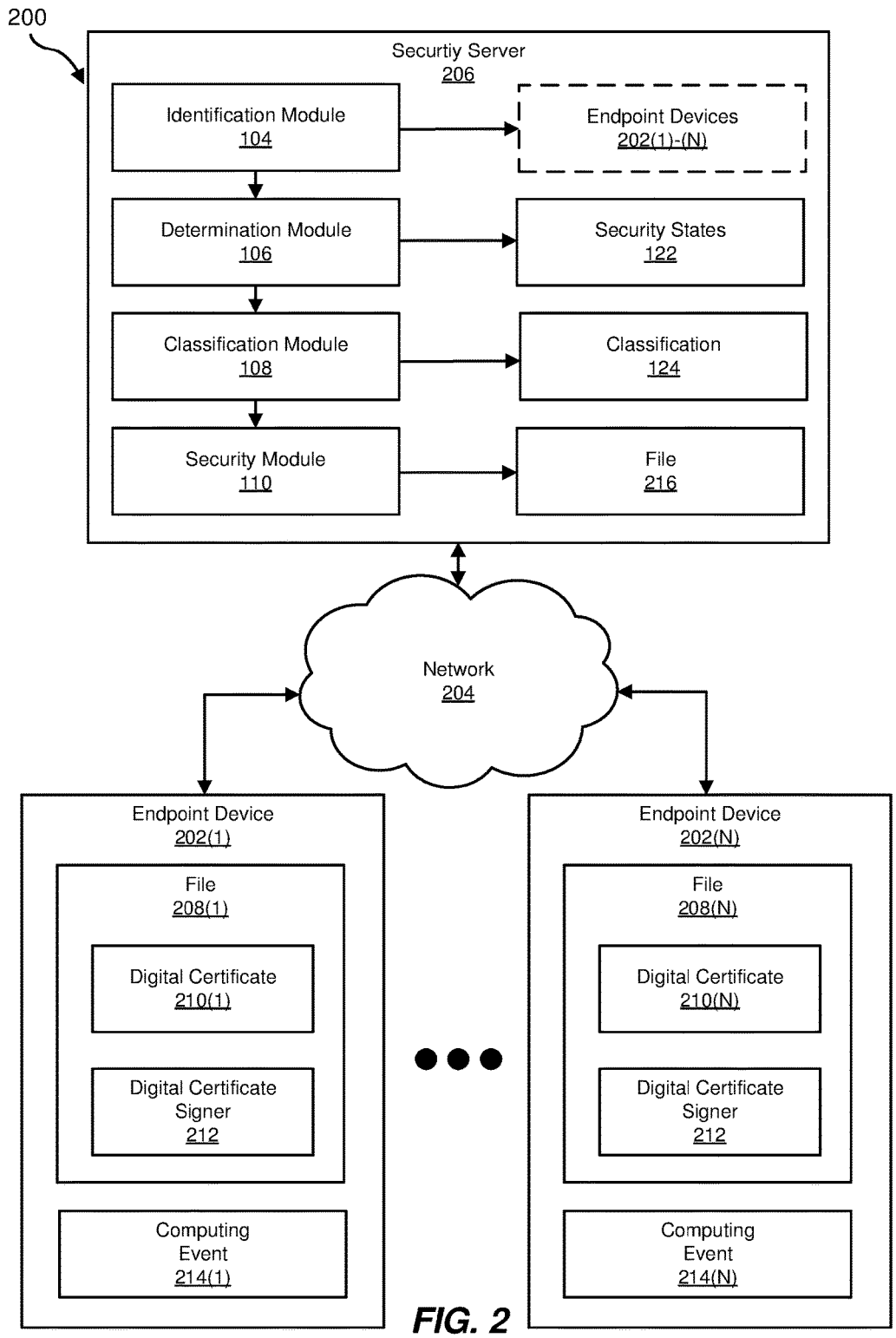
FIG. 2 is a block diagram of an additional example system for determining reputations of digital certificate signers.

The following will provide, with reference to FIGS. 1 and 2, detailed descriptions of example systems for determining reputations of digital certificate signers. Detailed descriptions of corresponding computer-implemented methods will also be provided in connection with FIG. 3. Detailed descriptions of example digital certificates will be provided in connection with FIG. 4. In addition, detailed descriptions of example classifications of digital certificate signers will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for determining reputations of digital certificate signers. As illustrated in this figure, example system 100 may include one or more modules 102 for performing one or more tasks. As will be explained in greater detail below, example system 100 may include an identification module 104 that identifies a group of endpoint devices that have accessed files to which a digital certificate signer has attached digital certificates that assert the files are legitimate. In addition, example system 100 may include a determination module 106 that determines, for each endpoint device, whether a security state of the endpoint device is compromised or uncompromised based on a security analysis of computing events detected on the endpoint device.

As will be explained in greater detail below, example system 100 may also include a classification module 108 that classifies the digital certificate signer as potentially malicious by determining that the files were accessed more frequently by endpoint devices with compromised security states than by endpoint devices with uncompromised security states. Finally, example system 100 may include a security module 110 that protects a security state of an additional endpoint device by preventing the additional endpoint device from accessing a file with a digital certificate signed by the digital certificate signer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., endpoint devices 202(1)-(N) and/or security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate determining reputations of digital certificate signers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In one example, additional elements 120 may include one or more security states of endpoint devices, such as security states 122. Security states 122 may indicate any assessment or representation of the hygiene, safety, protection, performance, and/or overall security of one or more endpoint devices. As illustrated in FIG. 1, additional elements 120 may also include one or more classifications, such as classification 124. In one example, classification 124 may indicate a reputation of a digital certificate signer.

Example system 100 in FIG. 1 may be implemented in a variety of ways. For example, all or a portion of example system 100 may represent portions of example system 200 in FIG. 2. As shown in FIG. 2, system 200 may include endpoint devices 202(1)-(N) in communication with a security server 206 via a network 204. In one example, all or a portion of the functionality of modules 102 may be performed by endpoint devices 202(1)-(N), security server 206, and/or any other suitable computing system. As will be described in greater detail below, one or more of modules 102 from FIG. 1 may, when executed by at least one processor of endpoint devices 202(1)-(N) and/or security server 206, enable endpoint devices 202(1)-(N) and/or security server 206 to determine reputations of digital certificate signers.

For example, and as will be described in greater detail below, identification module 104 may cause security server 206 to identify endpoint devices 202(1)-(N) that have accessed files 208(1)-(N) to which a digital certificate signer 212 has attached digital certificates 210(1)-(N) that assert files 208(1)-(N) are legitimate. In addition, determination module 106 may cause security server 206 to determine, for each of endpoint devices 202(1)-(N), whether security states 122 of endpoint devices 202(1)-(N) are compromised or uncompromised based on a security analysis of computing events 214(1)-(N) detected on endpoint devices 202(1)-(N). Next, classification module 108 may cause security server 206 to determine classification 124 of digital certificate signer 212 as potentially malicious by determining that files 208(1)-(N) were accessed more frequently by endpoint devices that have compromised security states than by endpoint devices that have uncompromised security states. Finally, security module 110 may cause security server 206 to protect a security state of an additional endpoint device by preventing the additional endpoint device from accessing a file 216 that has a digital certificate signed by digital certificate signer 212.

Endpoint devices 202(1)-(N) generally represents any type or form of computing device capable of reading computer-executable instructions. In one embodiment, endpoint devices 202(1)-(N) may represent endpoint devices of a group of users (e.g., employees within an organization and/or individuals that subscribe to a software security service). In this embodiment, endpoint devices 202(1)-(N) may run client-side security software (e.g., security agents) configured to detect malicious files and other security threats. Additional examples of endpoint devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Security server 206 generally represents any type or form of computing device that is capable of determining reputations of digital certificate signers based on security states of endpoint devices. In one embodiment, security server 206 may represent a backend security server that provides security services for one or more endpoint devices (e.g., endpoint devices 202(1)-(N)). Additional examples of security server 206 include, without limitation, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between endpoint devices 202(1)-(N) and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
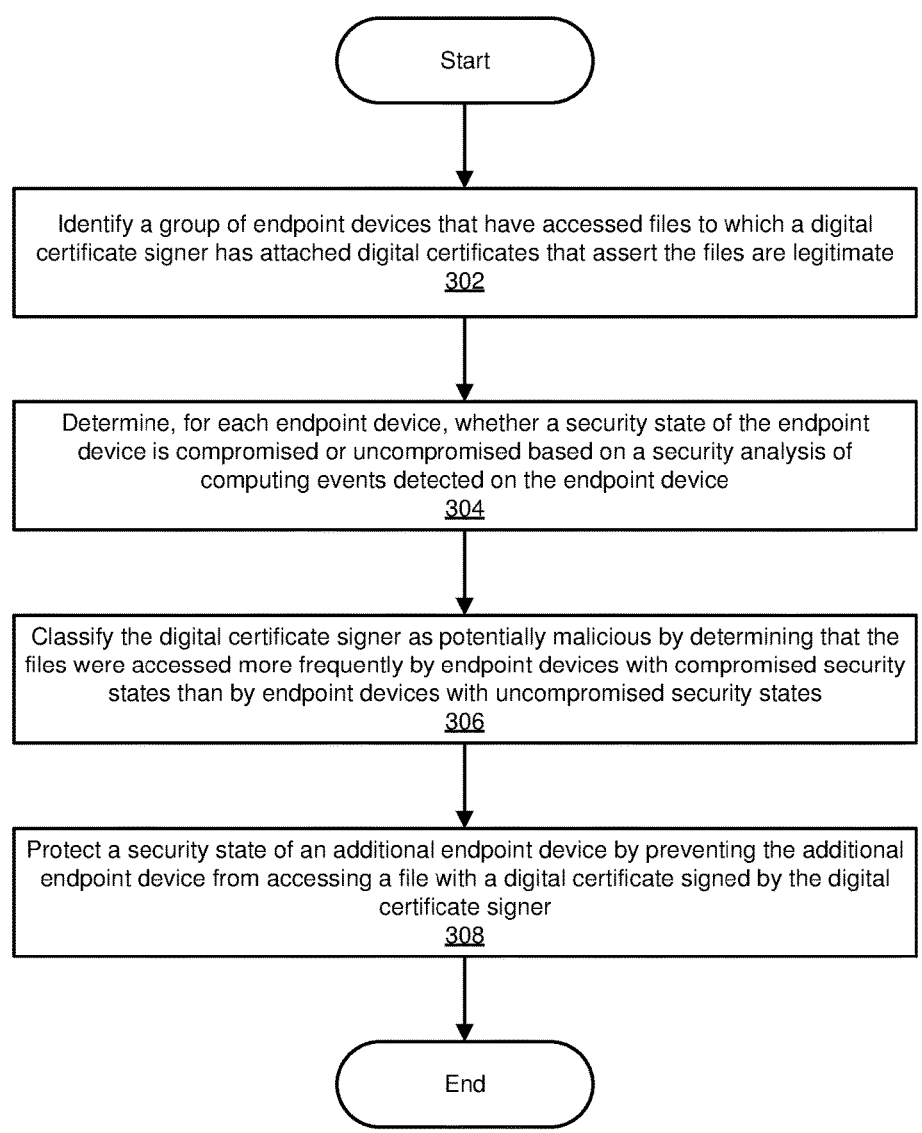
FIG. 3 is a flow diagram of an example method for determining reputations of digital certificate signers.

FIG. 3 is a flow diagram of an example computer-implemented method 300 for determining reputations of digital certificate signers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a group of endpoint devices that have accessed files to which a digital certificate signer has attached digital certificates that assert the files are legitimate. For example, identification module 104 may, as part of security server 206 in FIG. 2, identify endpoint devices 202(1)-(N) that have accessed files 208(1)-(N) to which digital certificate signer 212 has attached digital certificates 210(1)-(N) that assert files 208(1)-(N) are legitimate.

The term "file", as used herein, generally refers to any portion or unit of formatted data. In some examples, a file may include any data or executable code that a computing device may install, download, upload, execute, store, read, or otherwise access. Examples of files include, without limitation, documents, programs, applications, databases, cloud-based files, portions of cloud-based services, combinations or of one or more of the same, and/or variations of one or more of the same.

In some embodiments, a file may contain or be associated with a digital certificate. The term "digital certificate," as used herein, generally refers to any type or form of electronic document or portion of data that verifies, alleges, or claims the identity of an individual or entity. In one embodiment, a digital certificate may assert the identity of an owner of a public key included within the digital certificate. Additionally or alternatively, a digital certificate may assert the identity of a creator, developer, or owner of a file. In some examples, a digital certificate may assert the identity of an individual that created a file by providing a hash of the file that has been encrypted with a private key. This encrypted hash may represent the signature of the digital certificate. A user or computing device wishing to verify the legitimacy of the digital certificate, the creator of the file, and/or the contents of the file may decrypt the signature using a public key that corresponds to the private key. If the decrypted signature matches content of the file, the user may determine that the file has not been tampered with and/or that the individual to which the digital certificate has been issued is truthfully asserting their identity.

The term "digital certificate signer," as used herein, generally refers to any individual, organization, or entity that generates a digital signature for a digital certificate (e.g., encrypts content of a file with a private key). In some embodiments, a digital certificate signer for a file may also be the owner or creator of the file. For example, an owner of a file may sign the file's digital certificate with their own private key. Such certificates may be known as self-signed certificates. While self-signed certificates may be used by attackers and/or be indicative of malicious files, legitimate software developers may sometimes attach self-signed certificates to non-malicious files.

In other embodiments, an owner of a file may request that a third party sign a digital certificate on their behalf. For example, an individual may request a digital certificate from a certificate authority. The term "certificate authority," as used herein, generally refers to any type or form of trusted entity or organization that verifies the identity of an individual requesting a digital certificate before signing the digital certificate. In some examples, a certificate authority may sign a digital certificate using a private key that is associated with the individual requesting the certificate but known only to the certificate authority. As such, files with digital certificates signed by certificate authorities may generally be non-malicious. However, in some embodiments, an attacker may falsify credentials of a certificate authority. In addition, a legitimate certificate authority may be compromised or infiltrated by an attacker. As will be explained in greater detail below, the disclosed systems may detect malicious digital certificate signers of both self-signed certificates and certificates that claim to be signed by certificate authorities.

Figure 4:
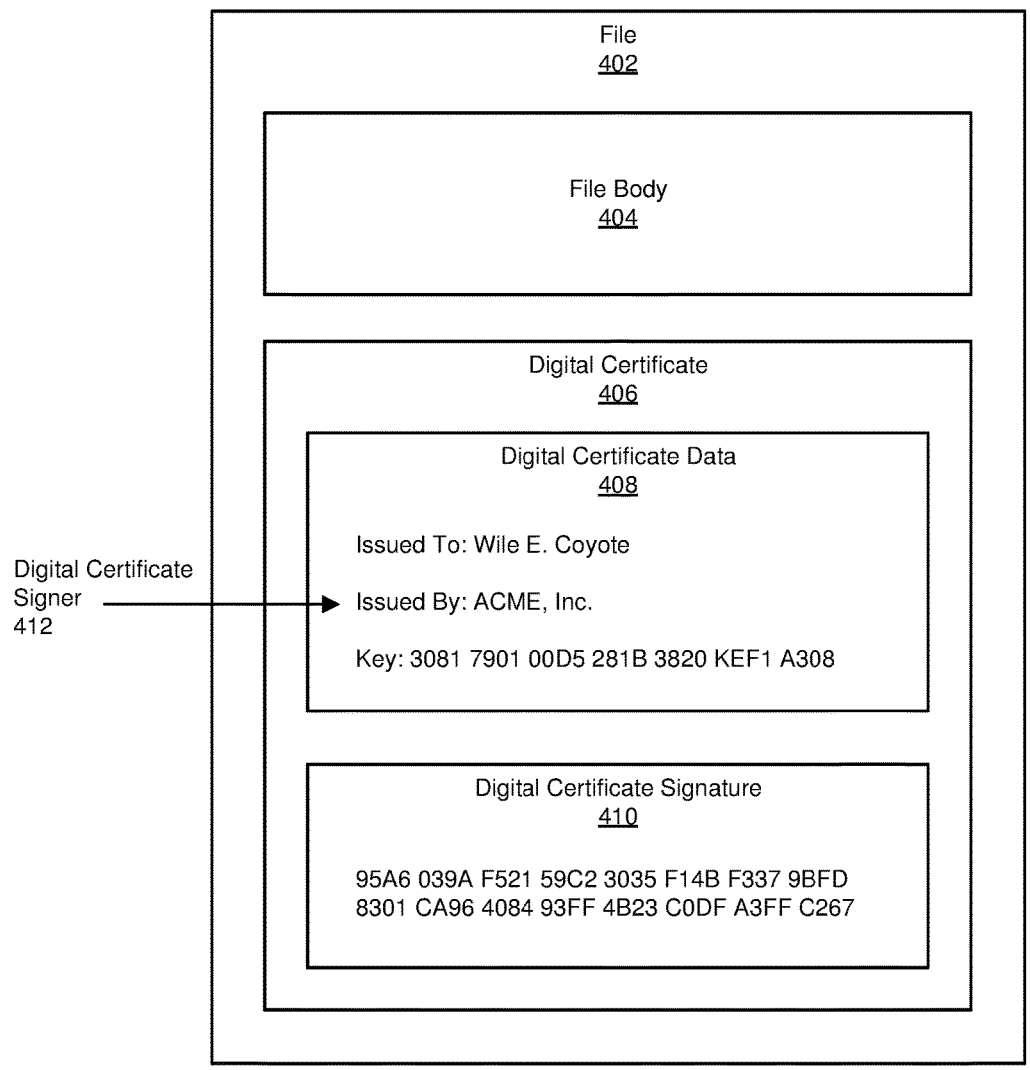
FIG. 4 is an illustration of an example digital certificate.

As an example of a digital certificate, FIG. 4 illustrates a file 402 that contains a file body 404 and a digital certificate 406. In this example, digital certificate data 408 within digital certificate 406 may identify the individual to which digital certificate 406 is issued (i.e., Wile E. Coyote). In addition, digital certificate data 408 may identify a digital certificate signer 412 (i.e., ACME, Inc.) allegedly responsible for signing digital certificate 406. Digital certificate data 408 may also include a public key associated with Wile E. Coyote, as well as additional information about digital certificate 406 not shown in FIG. 4, such as a serial number, a period of validity, and/or types of hash or encryption algorithms used to generate the certificate. In addition, as shown in FIG. 4, digital certificate 406 may include a digital certificate signature 410. In this example, digital certificate signature 410 may represent a hash of file body 404 after the hash has been encrypted with a private key known to and provided by digital certificate signer 412.

The systems described herein may identify a group of endpoint devices that have accessed files with digital certificates signed by a digital certificate signer in a variety of ways. In some examples, identification module 104 may monitor one or more endpoint devices to identify each unique digital certificate signer that has signed files accessed by the endpoint devices. For example, identification module 104 may deploy a security agent on multiple endpoint devices (e.g., each endpoint device within an enterprise or each endpoint device protected by a security service). These security agents may analyze files stored within the endpoint devices to identify any stored files that have digital certificates. Additionally or alternatively, the security agents may monitor incoming files to detect when a user is attempting to access a file with a digital certificate. For example, a security agent may determine whether any file that a user attempts to install, download, and/or execute contains a digital certificate. In one embodiment, a security agent may block attempts to access files with digital certificates signed by unknown or unverified signers until the disclosed systems determine the reputation of the signers.

After determining an endpoint device is attempting to access (or has previously accessed) a file with a digital certificate, a security agent may identify a signer of the digital certificate. For example, the security agent may search the digital certificate to identify an individual or entity responsible for issuing the digital certificate. The security agent may then send information about the digital certificate signer to identification module 104 (e.g., implemented within a backend security server). In addition, the security agent may send information that identifies the endpoint device on which the digital certificate signer was identified, a point in time at which the endpoint device accessed the file, and/or any additional information about the endpoint device or digital certificate signer. Security agents may report this information to identification module 104 in real-time (i.e., after each digital certificate signer is identified) or periodically (e.g., in batches). Furthermore, as will be explained in greater detail below, security agents may report information about the security states of endpoint devices and/or malicious computing events detected on the endpoint devices.

In some embodiments, identification module 104 may collect and store information about digital certificate signers identified on one or more endpoint devices. For example, identification module 104 may record each digital certificate signer identified within an enterprise and/or identified on endpoint devices that subscribe to an anti-malware service. Identification module 104 may then identify, for one or more digital certificate signers, all or a portion of the endpoint devices that accessed files with digital certificates signed by the digital certificate signer. In one example, identification module 104 may identify each endpoint device that has ever accessed at least one file with a digital certificate signed by a particular digital certificate signer. In other examples, identification module 104 may identify each endpoint device that has accessed files signed by a particular digital certificate signer within a predetermined amount of time (e.g., within the past two weeks).

Returning to FIG. 3, at step 304 one or more of the systems described herein may determine, for each endpoint device, whether a security state of the endpoint device is compromised or uncompromised based on a security analysis of computing events detected on the endpoint device. For example, determination module 106 may, as part of security server 206 in FIG. 2, determine whether security states 122 of endpoint devices 202(1)-(N) are compromised or uncompromised based on security analyses of computing events 214(1)-(N).

The term "security state," as used herein, generally refers to any evaluation, representation, or overall measure of the hygiene, safety, and/or performance of a computing device. In general, an endpoint device with a compromised security state may currently be suffering from (or have recently experienced) consequences of a security attack or breach. For example, an endpoint device with a one or more malware infections may have a compromised security state. In contrast, an endpoint device with few or no malware infections may have an uncompromised security state.

The systems described herein may determine whether the security state of an endpoint device is compromised or uncompromised in a variety of ways. In some examples, determination module 106 may determine whether the security of an endpoint device is compromised by determining whether the endpoint device has experienced unusual, unexpected, and/or unwanted behaviors indicative of a security threat. For example, determination module 106 may determine whether one or more suspicious or malicious computing events have recently occurred on the endpoint device.

The term "computing event," as used herein, generally refers to any type or form of incident, behavior, or action detected on or in connection with a computing device. Examples of computing events include, without limitation, alterations to data stored within a computing device, attempts by a user of a computing device to download, install, or execute a file or program on the computing device, attempts by a user of a computing device to distribute information from the computing device, and/or attempts by an external entity to access information within a computing device. The term "malicious computing event," as used herein, generally refers to any computing event that may harm the performance or security of a computing device and/or is indicative of a security breach or attack. In one example, a malicious computing event may include attempts to install and/or execute malicious software (e.g., viruses, worms, Trojan horses, rootkits, spyware, adware, etc.). In addition, the term "suspicious computing event," as used herein, generally refers to any computing event potentially associated with a security breach or attack (i.e., computing events not yet conclusively classified as malicious or non-malicious).

In some embodiments, determination module 106 may identify all ora portion of the suspicious and/or malicious computing events that occurred on an endpoint device. For example, determination module 106 receive, from a security agent deployed on the endpoint device, each computing event detected on the endpoint device that indicates the endpoint device may have been breached or attacked. Determination module 106 may then determine whether the security state of the endpoint device is compromised or uncompromised based on the number and/or severity of malicious computing events detected on the endpoint device. For example, determination module 106 may determine that the security state of an endpoint device has been compromised in the event that at least a predetermined number (e.g., one, two, or five) of malicious computing events have been detected on the endpoint device. Additionally or alternatively, determination module 106 may determine that the security state of an endpoint device has been compromised in the event that a single highly malicious computing event (such as a known malware infection) has been identified on the endpoint device. Moreover, determination module 106 may determine that the security state of an endpoint device is uncompromised in the event that the endpoint device has not experienced any suspicious or malicious computing events.

Furthermore, in some examples, determination module 106 may determine whether the security state of an endpoint device has been compromised based on recently-detected malicious computing events on the endpoint device. For example, when determining the reputation of a particular digital certificate signer, the disclosed systems may analyze computing events detected on endpoint devices after the endpoint devices have accessed files with digital certificates signed by the particular signer. In other words, determination module 106 may exclude computing events that occurred prior to the endpoint devices' interactions with the digital certificate signer, as these events may not be indicative of the signer's reputation.

In some embodiments, after identification module 104 identifies each endpoint device that has accessed one or more files with digital certificates signed by a particular digital certificate signer, determination module 106 may determine whether the security state of each identified endpoint device has been compromised. Determination module 106 may then record and store these assessments (e.g., within a backend security server).

Returning to FIG. 3, at step 306 one or more of the systems described herein may classify the digital certificate signer as potentially malicious by determining that the files were accessed more frequently by endpoint devices with compromised security states than by endpoint devices with uncompromised security states. For example, classification module 108 may, as part of security server 206 in FIG. 2, classify digital certificate signer 212 as potentially malicious by determining that files 208(1)-(N) were more frequently accessed by endpoint devices with compromised security states than by endpoint devices with uncompromised security states.

The term "malicious digital certificate signer," as used herein, generally refers to any digital certificate signer that has signed one or more digital certificates attached to files containing illegitimate or malicious content. In one embodiment, a malicious digital certificate signer may attach self-signed certificates to malicious software. In other embodiments, a malicious digital certificate signer may generate a digital certificate that falsely alleges the identity of a creator or owner of a file. For example, a malicious digital certificate signer may create a digital certificate that falsely appears to be issued to a legitimate software developer. Additionally or alternatively, a malicious digital certificate signer may falsely provide credentials of a legitimate digital certificate signer. For example, a malicious digital certificate signer may falsify or steal credentials of a certificate authority.

The systems described herein may classify a digital certificate signer as potentially malicious in a variety of ways. In some examples, classification module 108 may determine that a digital certificate signer is potentially malicious based on determining that files with digital certificate signed by the digital certificate signer have been more frequently accessed by endpoint devices with compromised security states than by endpoint devices with uncompromised security states. For example, classification module 108 may determine that a digital certificate signer is malicious in the event that only endpoint devices with compromised security states have accessed files with certificates signed by the digital certificate signer. In another example, classification module 108 may determine that a digital certificate signer is malicious in the event that both endpoint devices with compromised security states and endpoint devices with uncompromised security states have accessed files with certificates signed by the digital certificate signer, but that the number of compromised endpoint devices exceeds the number of uncompromised devices (e.g., by a certain amount or percentage). Conversely, classification module 108 may classify a digital certificate signer as non-malicious in the event that uncompromised endpoint devices have more frequently accessed files with certificates signed by the signer than compromised endpoint devices.

As an example of classifying digital certificate signers, FIG. 5 illustrates a table of digital certificate signer classifications 502. In this example, table 502 may describe the security states of endpoint devices that have accessed files with digital certificates signed by various digital certificate signers (i.e., Signer A, Signer B, Signer C, and Signer D). In addition, table 502 may indicate the classification of each signer based on security states of the endpoint devices. As shown in FIG. 5, table 502 may indicate that digital certificates signed by Signer A were accessed by 1034 compromised endpoint devices and 56 uncompromised devices. Accordingly, classification module 108 may determine that while digital certificates signed by Signer A have been accessed by both endpoint devices with compromised security states and endpoint devices with uncompromised security states, Signer A is more frequently associated with endpoint devices that have compromised security states. As such, classification module 108 may determine that Signer A is likely malicious. Similarly, classification module 108 may also infer that Signer C and Signer D are malicious based on Signer C and Signer D being more frequently accessed by compromised endpoint devices than by uncompromised endpoint devices. Finally, classification module 108 may determine that Signer B is non-malicious based on Signer B being more frequently accessed by uncompromised devices than by compromised devices.

In one embodiment, classification module 108 may update the classification of one or more digital certificate signers. For example, after classification module 108 has determined an initial classification of a digital certificate signer, the disclosed systems may periodically evaluate (or re-evaluate) security states of endpoint devices that have recently accessed files with certificates signed by the digital certificate signer. In this way, classification module 108 may identify legitimate digital certificate signers that have been compromised or hacked by attackers.

As an example, classification module 108 may initially determine that a digital certificate signer is more frequently associated with uncompromised endpoint devices than compromised endpoint devices, and therefore classify the digital certificate signer as legitimate. Classification module 108 may continue to monitor security states of endpoint devices that access files with certificates signed by the digital certificate signer after the initial classification has been determined. Based on this continued analysis, classification module 108 may identify a point in time at which the signer becomes more frequently associated with compromised endpoint devices than uncompromised endpoint devices. As such, classification module 108 may conclude that the digital certificate signer has started to distribute malicious content. Accordingly, classification module 108 may determine that files with certificates signed by the digital certificate signer before the identified point in time are legitimate, while files with certificates signed by the digital certificate signer after the identified point in time may be malicious.

Returning to FIG. 3, at step 308 one or more of the systems described herein may protect a security state of an additional endpoint device by preventing the additional endpoint device from accessing a file with a digital certificate signed by the digital certificate signer. For example, security module 110 may, as part of security server 206 in FIG. 2, protect a security state of one of endpoint devices 202(1)-(N) by preventing the endpoint device from accessing file 216 that has a digital certificate signed by digital certificate signer 212.

The systems described herein may prevent an endpoint device from accessing files with digital certificates signed by malicious digital certificate signers in a variety of ways. In some examples, after classification module 108 classifies a digital certificate signer as potentially malicious, security module 110 may add the digital certificate signer to a blacklist of signers known to be harmful or illegitimate. Security module 110 may then prevent one or more endpoint devices from accessing files signed by the digital certificate signer by detecting all or a portion of the files the endpoint devices attempt to access, identifying digital certificate signers of digital certificates attached to the files, and then comparing the identified signers with the blacklist. In the event that an identified signer is included within the blacklist, security module 110 (or a client-side security agent managed by security module 110) may cancel, terminate, block, or otherwise prevent a detected attempt to access a file signed by the malicious digital certificate signer. In some examples, security module 110 may perform one or more additional security actions, such as notifying a user or administrator about the attempt to access the file and/or conducting further security analyses of the digital certificate signer or the file.

Similarly, security module 110 may add digital certificate signers classified as non-malicious to a whitelist of signers that are known to be safe and/or legitimate. In the event that security module 110 determines that an endpoint device is attempting to access a file signed by a digital certificate signer included within the whitelist, security module 110 may permit the attempt.

As explained above in connection with FIG. 3, a security service may determine reputations of digital certificate signers based on security states of endpoint devices that have accessed files with certificates signed by the digital certificate signers. For example, the security service may identify all or a portion of the digital certificate signers that have signed files accessed by a group of endpoint devices. To determine the reputation of a particular digital certificate signer, the security service may first identify each endpoint device that has accessed files with certificates signed by the signer. Next, the security service may determine, for each identified endpoint device, whether the security state of the endpoint device has been compromised (e.g., by identifying malware infections and other security threats on the endpoint devices). In the event that compromised endpoint devices have more frequently accessed files with certificates signed by the digital certificate signer than uncompromised devices, the security service may conclude that the digital certificate signer is potentially malicious. In response, the security service may implement security policies that prevent endpoint devices from accessing files signed by the digital certificate signer.

Figure 6:
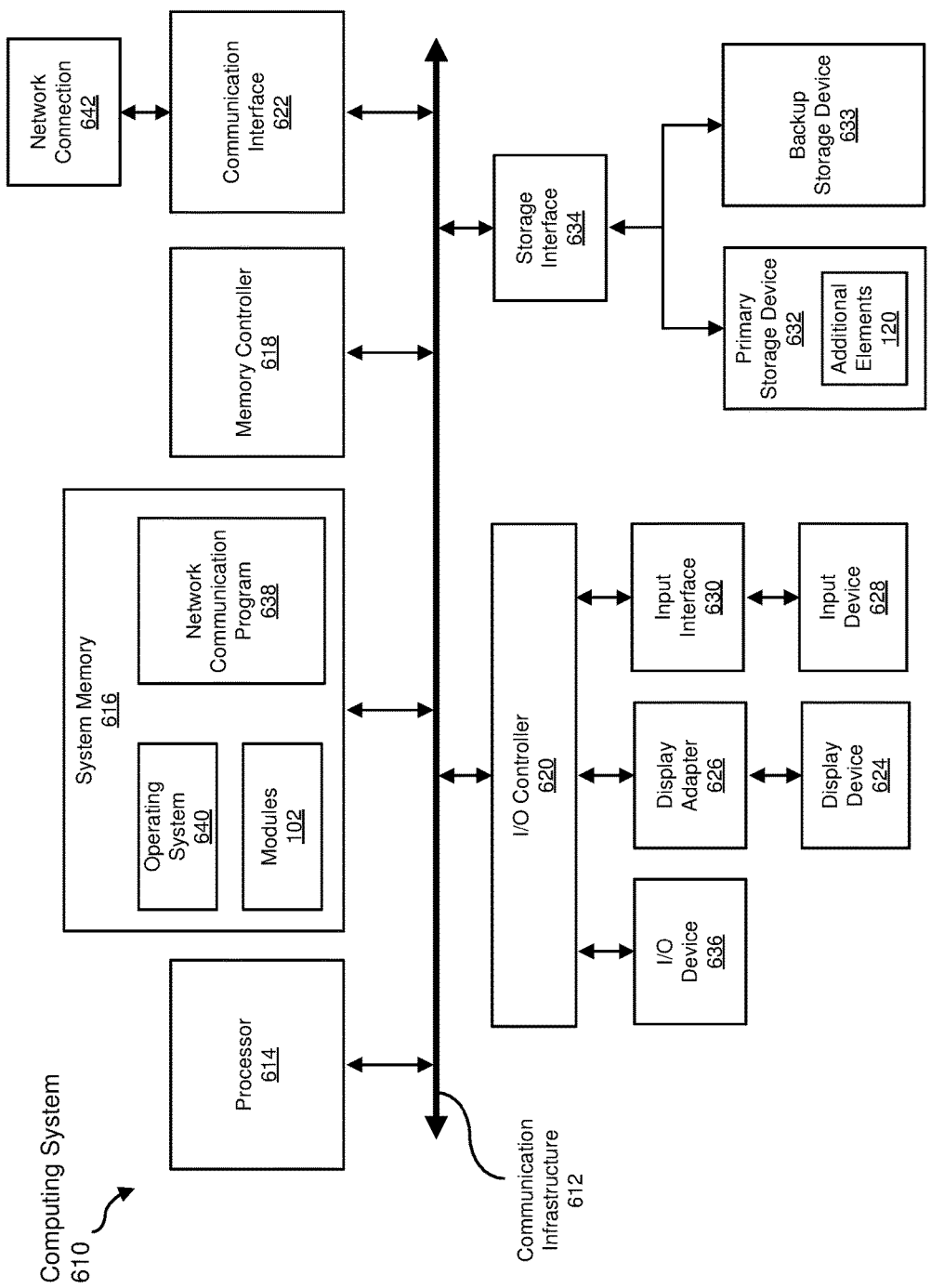
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
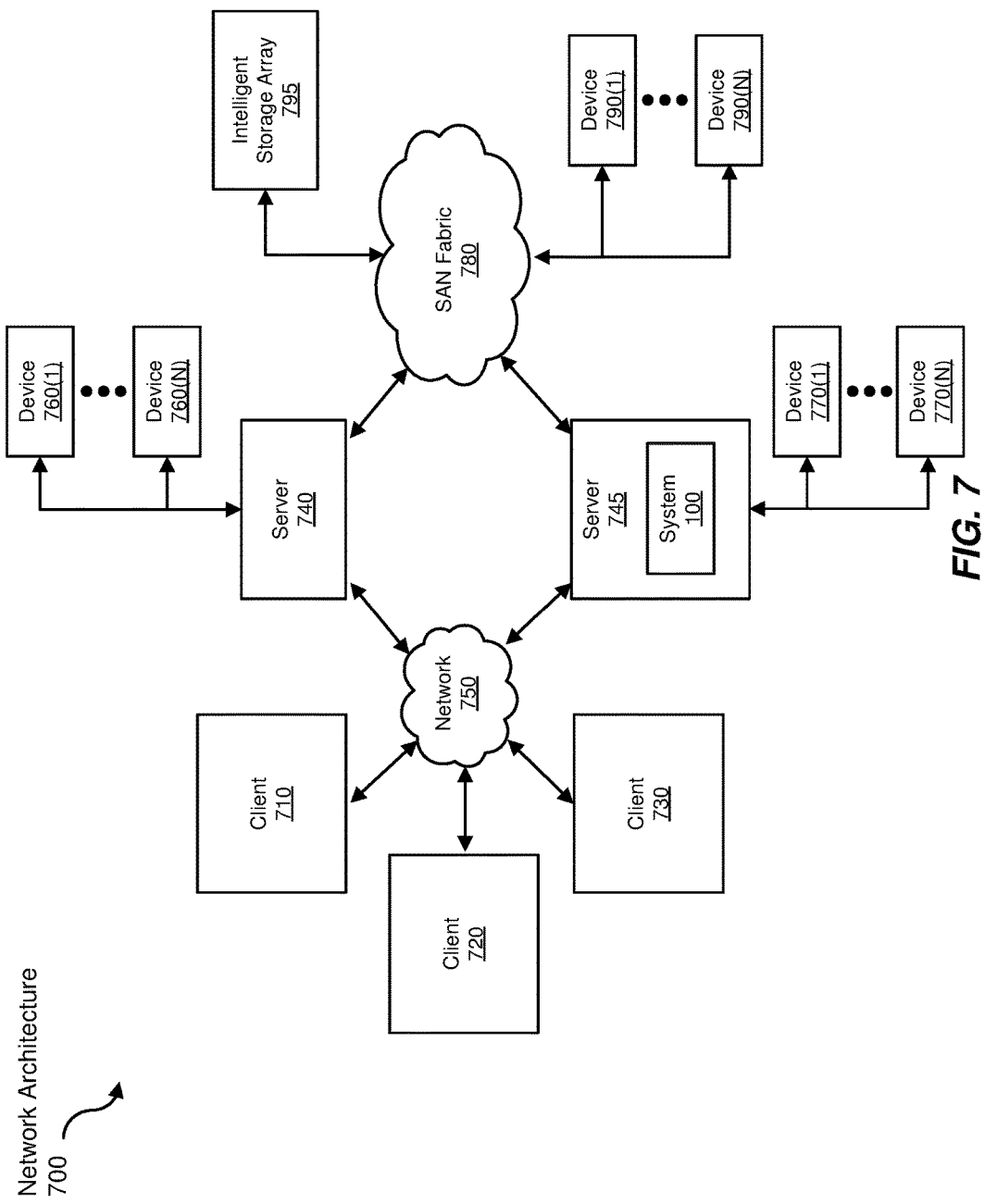
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for determining reputations of digital certificate signers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive computing events detected on endpoint devices that have accessed files with digital certificates signed by a digital certificate signer to be transformed, transform the computing events into a reputation of the digital certificate signer, output a result of the transformation to one or more endpoint devices, use the result of the transformation to prevent endpoint devices from accessing files signed by malicious digital certificate signers, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining reputations of digital certificate signers, at least a portion of the method being performed by a computing device comprising at least one processor, the method comprising:

identifying a plurality of endpoint devices that have accessed files to which a digital certificate signer has attached digital certificates that assert the files are legitimate;

determining, for each endpoint device, whether a security state of the endpoint device is compromised or uncompromised based on a security analysis of computing events detected on the endpoint device;

classifying the digital certificate signer as potentially malicious by determining that the files were accessed more frequently by endpoint devices with compromised security states than by endpoint devices with uncompromised security states; and protecting a security state of an additional endpoint device by preventing the additional endpoint device from accessing a file with a digital certificate signed by the digital certificate signer.

2. The method of claim 1, wherein the digital certificate signer comprises a creator of the files.

3. The method of claim 1, wherein the digital certificate signer comprises a third party not associated with the creation of the files.

4. The method of claim 1, wherein identifying the plurality of endpoint devices that have accessed the files comprises identifying, via an agent installed on each endpoint device within an enterprise, digital certificate signers of digital certificates attached to each file accessed by the endpoint devices within the enterprise.

5. The method of claim 1, wherein determining whether the security state of the endpoint device is compromised or uncompromised comprises determining whether at least a predetermined number of malicious computing events occurred on the endpoint device.

6. The method of claim 1, wherein classifying the digital certificate signer as potentially malicious comprises analyzing the security states of the endpoint devices that accessed the files, rather than analyzing security characteristics of the files.

7. The method of claim 1, wherein preventing the additional endpoint device from accessing the file with the digital certificate signed by the digital certificate signer comprises:
   adding the digital certificate signer to a blacklist of digital certificate signers known to be malicious; and
   comparing digital certificate signers of digital certificates attached to each file the additional endpoint device attempts to access with the blacklist before allowing the additional endpoint device to access the files.

8. The method of claim 1, further comprising:
   classifying an additional digital certificate signer as legitimate by determining that at least one additional file to which the additional digital certificate signer has attached an additional digital certificate was accessed more frequently by endpoint devices with uncompromised security states than by endpoint devices with compromised security states; and
   adding the additional digital certificate signer to a whitelist of digital certificate signers known to be legitimate.

9. A system for determining reputations of digital certificate signers, the system comprising:
   an identification module, stored in memory, that identifies a plurality of endpoint devices that have accessed files to which a digital certificate signer has attached digital certificates that assert the files are legitimate;
   a determination module, stored in memory, that determines, for each endpoint device, whether a security state of the endpoint device is compromised or uncompromised based on a security analysis of computing events detected on the endpoint device;
   a classification module, stored in memory, that classifies the digital certificate signer as potentially malicious by determining that the files were accessed more frequently by endpoint devices with compromised security states than by endpoint devices with uncompromised security states;
   a security module, stored in memory, that protects a security state of an additional endpoint device by preventing the additional endpoint device from accessing a file with a digital certificate signed by the digital certificate signer; and
   at least one physical processor configured to execute the identification module, the determination module, the classification module, and the security module.

10. The system of claim 9, wherein the digital certificate signer comprises a creator of the files.

11. The system of claim 9, wherein the digital certificate signer comprises a third party not associated with the creation of the files.

12. The system of claim 9, wherein the identification module identifies the plurality of endpoint devices that have accessed the files by receiving, from agents installed on each endpoint device within an enterprise, digital certificate signers of digital certificates attached to each file accessed by the endpoint devices within the enterprise.

13. The system of claim 9, wherein the determination module determines whether the security state of the endpoint device is compromised or uncompromised by determining whether at least a predetermined number of malicious computing events occurred on the endpoint device.

14. The system of claim 9, wherein the classification module classifies the digital certificate signer as potentially malicious by analyzing the security states of the endpoint devices that accessed the files, rather than analyzing security characteristics of the files.

15. The system of claim 9, wherein the security module prevents the additional endpoint device from accessing the file with the digital certificate signed by the digital certificate signer by:
   adding the digital certificate signer to a blacklist of digital certificate signers known to be malicious; and
   comparing digital certificate signers of digital certificates attached to each file the additional endpoint device attempts to access with the blacklist before allowing the additional endpoint device to access the files.

16. The system of claim 9, wherein:
   the classification module further classifies an additional digital certificate signer as legitimate by determining that at least one additional file to which the additional digital certificate signer has attached an additional digital certificate was accessed more frequently by endpoint devices with uncompromised security states than by endpoint devices with compromised security states; and
   the security module further adds the additional digital certificate signer to a whitelist of digital certificate signers known to be legitimate.

17. A non-transitory computer-readable medium comprising one or more computer-executable instructions that, when executed by at least one processor of a computing device, cause the computing device to:
   identify a plurality of endpoint devices that have accessed files to which a digital certificate signer has attached digital certificates that assert the files are legitimate;
   determine, for each endpoint device, whether a security state of the endpoint device is compromised or uncompromised based on a security analysis of computing events detected on the endpoint device;
   classify the digital certificate signer as potentially malicious by determining that the files were accessed more frequently by endpoint devices with compromised security states than by endpoint devices with uncompromised security states; and
   protect a security state of an additional endpoint device by preventing the additional endpoint device from accessing a file with a digital certificate signed by the digital certificate signer.

18. The computer-readable medium of claim 17, wherein the digital certificate signer comprises a creator of the files.

19. The computer-readable medium of claim 17, wherein the digital certificate signer comprises a third party not associated with the creation of the files.

20. The computer-readable medium of claim 17, wherein the computer-executable instructions cause the computing device to determine whether the security state of the endpoint device is compromised or uncompromised by determining whether at least a predetermined number of malicious computing events occurred on the endpoint device.

* * * * *